United States Patent [19]

Takahashi

[11] Patent Number: 5,724,479
[45] Date of Patent: Mar. 3, 1998

[54] FLUID FLOW CONTROLLING MEMBER

[76] Inventor: Kei Takahashi, 14-16, Achi 1-chome, Kurashiki-shi, Okayama-ken, Japan

[21] Appl. No.: 580,168

[22] Filed: Dec. 28, 1995

[30] Foreign Application Priority Data

| Dec. 28, 1994 | [JP] | Japan | 6-339265 |
| Dec. 30, 1994 | [JP] | Japan | 6-339259 |
| Nov. 27, 1995 | [JP] | Japan | 7-333909 |

[51] Int. Cl.[6] .............. F28D 7/00; F28F 3/00; F28F 21/00; F24J 2/22
[52] U.S. Cl. .............. 392/496; 165/53; 219/213; 126/675
[58] Field of Search ............ 165/53, 907; 219/213, 219/529, 549; 126/674, 675, 621; 239/208, 209; 392/490, 496

[56] References Cited

U.S. PATENT DOCUMENTS

| 3,725,638 | 4/1973 | Solin et al. | 219/213 |
| 4,180,057 | 12/1979 | Ward | 126/675 |
| 4,401,880 | 8/1983 | Eizenhoefer | 219/213 |
| 4,517,958 | 5/1985 | Worf | 126/630 |
| 4,588,125 | 5/1986 | Lutz | 165/53 X |
| 5,460,164 | 10/1995 | Rekstad et al. | 126/675 X |
| 5,484,983 | 1/1996 | Roell | 219/529 X |
| 5,591,365 | 1/1997 | Shields | 219/213 |

FOREIGN PATENT DOCUMENTS

| 63-297966 | 12/1988 | Japan . |
| 1-147257 | 6/1989 | Japan . |
| 63-134631 | 4/1990 | Japan . |
| 1-16038 | 8/1990 | Japan . |
| 1-7330 | 8/1990 | Japan . |
| 2-56917 | 2/1992 | Japan . |
| 2-100390 | 5/1992 | Japan . |
| 2-108200 | 5/1992 | Japan . |
| 2-96227 | 5/1992 | Japan . |
| 4-165266 | 6/1992 | Japan . |
| 4-306459 | 10/1992 | Japan . |
| 3-64574 | 2/1993 | Japan . |
| 5-26517 | 2/1993 | Japan . |
| 3-67993 | 12/1993 | Japan . |
| 3-72541 | 12/1993 | Japan . |
| 4-90651 | 7/1994 | Japan . |
| 6-185811 | 7/1994 | Japan . |
| 5-3157 | 8/1994 | Japan . |
| 5-3768 | 8/1994 | Japan . |
| 5-9652 | 9/1994 | Japan . |
| 5-9654 | 9/1994 | Japan . |
| 5-71194 | 7/1995 | Japan . |
| 5-75789 | 7/1995 | Japan . |
| 5-75359 | 8/1995 | Japan . |
| 5-75540 | 8/1995 | Japan . |

*Primary Examiner*—Peter S. Wong
*Assistant Examiner*—Patrick B. Law
*Attorney, Agent, or Firm*—Wenderoth, Lind & Ponack

[57] ABSTRACT

The present invention relates to a fluid flow controlling member including a primary flow path having a relatively small capacity of containing fluid and a secondary flow path located on a side of the primary flow path and having a relatively large capacity of containing fluid. The primary flow path absorbs part of the flowing fluid and the remaining fluid flows along the surface of the primary flow path in an exposed manner.

A difference between the velocities of the exposed fluid flows moving through the primary and secondary flow paths is created so as to define a boundary area for restrictedly controlling at least the exposed flowing fluid on the primary flow path.

20 Claims, 4 Drawing Sheets

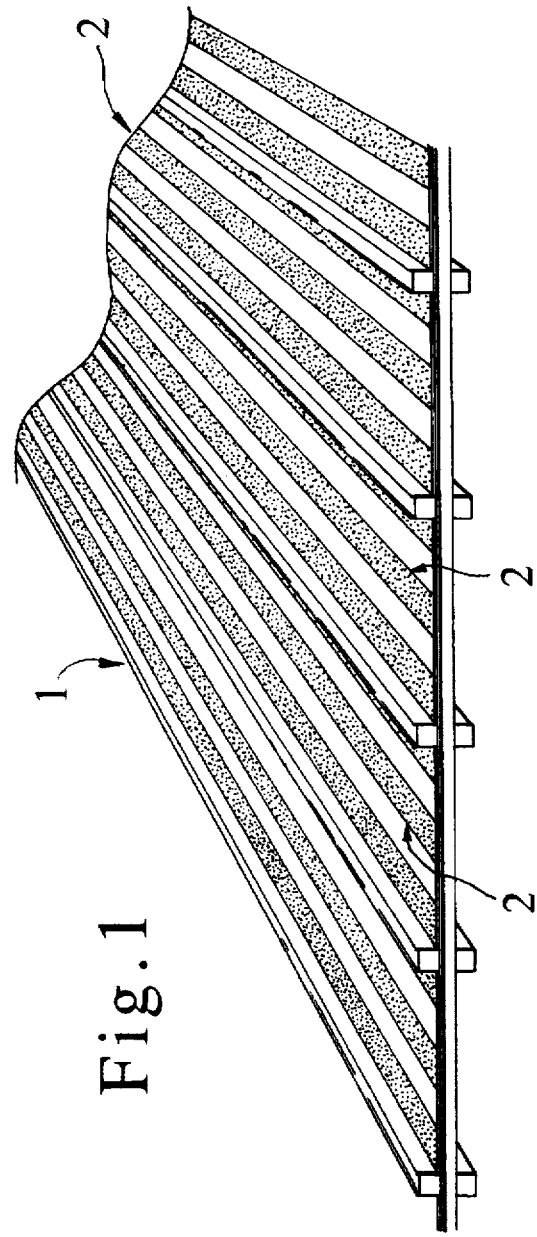
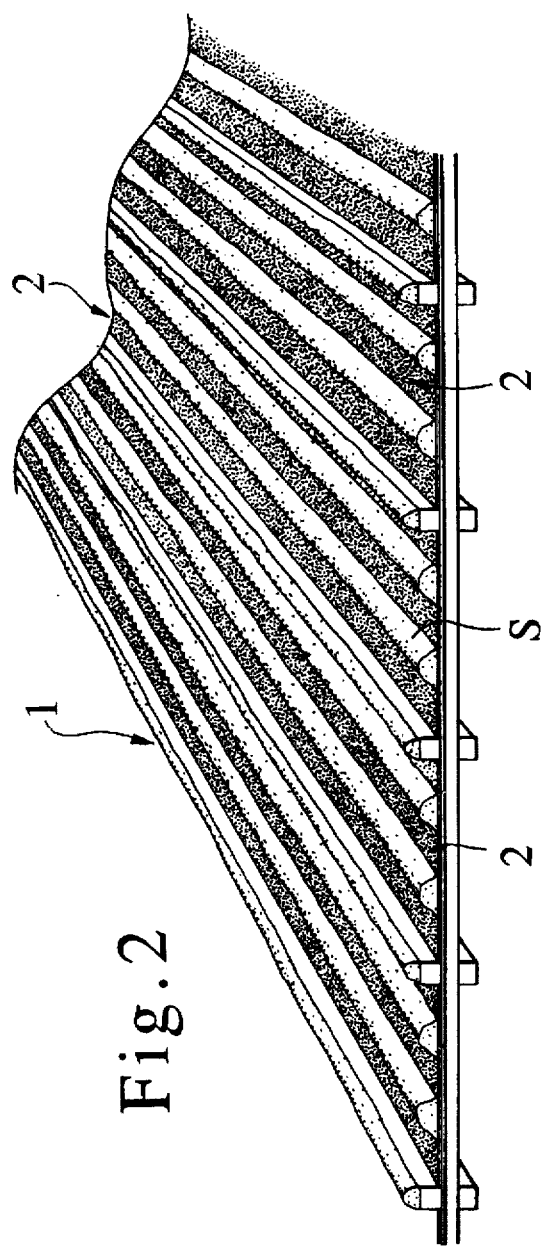
Fig.1
Fig.2

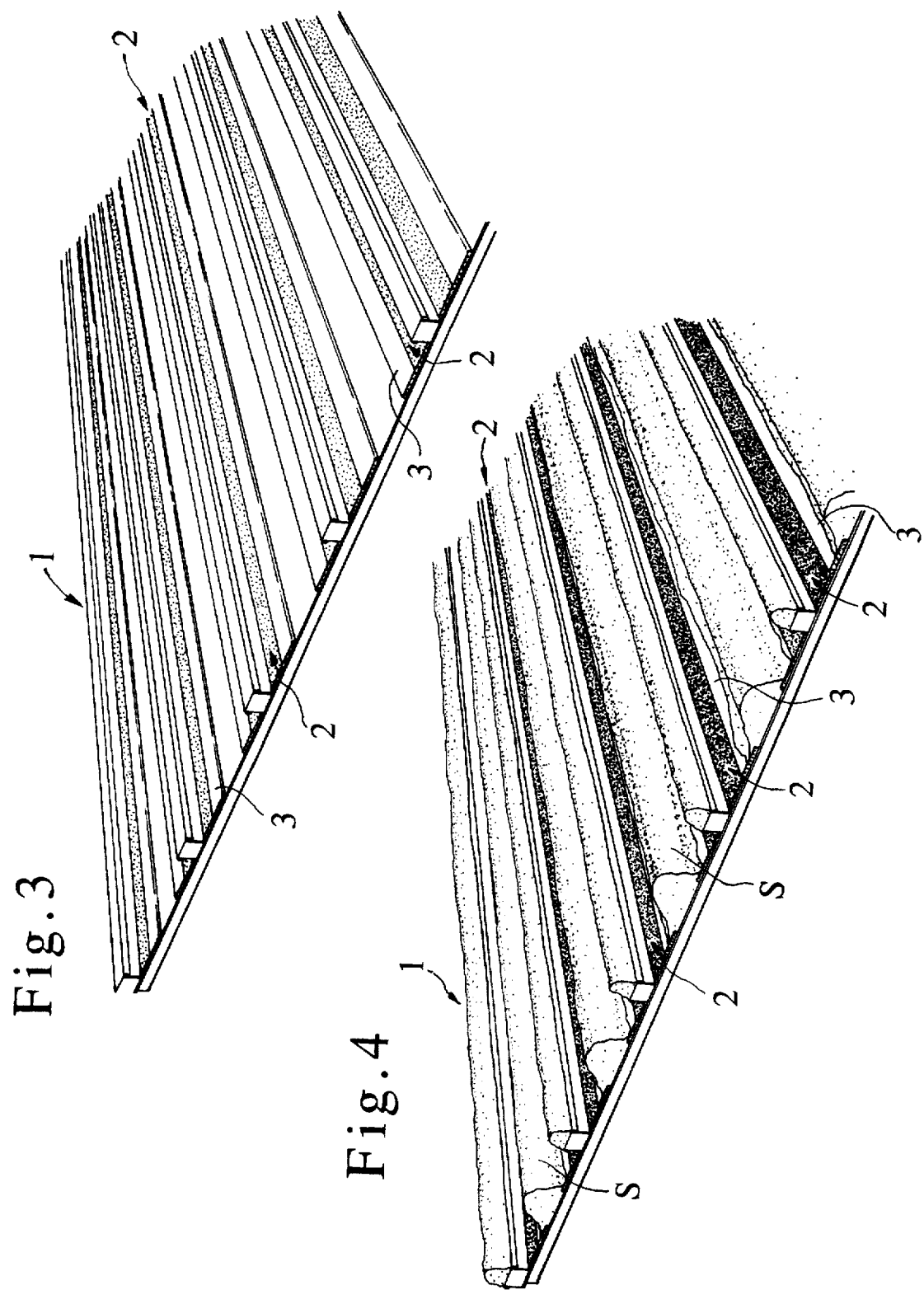

FLUID FLOW CONTROLLING MEMBER

BACKGROUND OF THE INVENTION

1. Field of the Invention

The present invention relates to a fluid flow controlling member for restrictively flowing fluid in a controlled manner, and more particularly, the present invention also relates to a flowing medium controlling member for restricting a course of flowing to maintain the fluid flow in equilibrium condition. Herein, the fluid includes various heating mediums, such as hot water, underground water, cooling water, water to be evaporated, and a fluid to be heated. Accordingly, the present invention can be applied to heat exchangers, fluid delivering means, evaporators and the like.

The fluid flow controlling member of the present invention can also be used as a fluid flow controlling member for accelerating diffusion of a fluid on the member. Further, the present invention can be used as a fluid flow controlling member for diffusively supplying and appropriately distributing hydroponic culture solution serving as heat reserving liquid.

The fluid flow controlling member may be adhered to a surface of a roof or building wall, or heat transfer surfaces of heat exchangers. In case of using the fluid flow controlling member on the roof, when hot water is supplied along the member, snow on the roof in the winter can be removed or melted. In the summer, solar heat can be collected by the member. Further, if cooling water is supplied along the member, the surface of the roof or wall is cooled.

2. Description of the Prior Art

In order to control fluid flow, there have been proposed various sheets by the applicant of the present invention. The flowing condition of moving fluid is affected by an using manner of the sheet. When using the sheet, it is set to be contacted with a surface of an object or to be extended between holders.

Assuming that the sheet is adhered to a roof surface of a building, a thermal insulation layer is typically provided beneath the roof as a backing, and the roof surface is conspicuously irregular when the persons walk on the roof during the construction work, as compared with a roof provided with no insulation layer. Accordingly, when the sheet is adhered to the roof having the uneven surface, a fluid controlling function possessed by the sheet is remarkably deteriorated. There often occurs local short-circuit of the moving fluid due to the velocity of the flowing fluid so that the controlling effect of the sheet is substantially lost. In actual, there is seen the paint coating surface of the already-constructed roof which has been considerably deteriorated. In this connection, it is required to strictly control the quality of the work during setting the sheet on the roof in site. Further, the wind largely affects the flowing fluid on the sheet. That is, when the sheet is exposed to strong wind, the fluid tends to flow while being deviated or displaced from the flow path. When the temperature of the environment is low, the fluid deviated from the flow path readily freezes.

SUMMARY OF THE INVENTION

An object of the present invention is to provide a reliable fluid flow controlling member which can always control the flow of fluid stably, without being largely deteriorated in performance due to the condition of a surface on which the member is to be contacted or due to the influence of wind, or without any restrictions upon use of the member.

According to the invention, there is provided a fluid flow controlling member having a base layer forming a waterproof layer and a fluid absorbing layer provided on the base layer, the fluid absorbing layer comprising a primary flow path which has a relatively small capacity of containing fluid so that it absorbs part of the flowing fluid and the remaining fluid flows along the surface of the primary flow path in an exposed manner, and a secondary flow path located on a side of the primary flow path and having a relatively large capacity of containing fluid, whereby a difference between the velocities of the exposed fluid flows moving through the primary and secondary flow paths is created so as to define a boundary area for restrictedly controlling at least the exposed flowing fluid on the primary flow path.

Accordingly, an auxiliary stream of the heating medium is located on a side of a main stream of the heating medium flowing along the primary flow path. Thus, the velocity difference boundary happens at an area between the primary and secondary paths. In this respect, the fluid flow is created over the entire surface of the fluid absorbing layer.

The exposed main stream sliding on the surface of the path is formed along the fluid absorbing layer. Possibly, the auxiliary stream flowing at a speed slower than the main stream is formed on the side of the main stream by the secondary flow path having the large fluid containing capacity (or having a large resistance against the flowing of the fluid and great ability to absorb the fluid). Accordingly, even when a contacting surface to which the fluid flow controlling member of the invention is to be adhered, is uneven, the fluid of the main stream which tends to displace may be absorbed by the secondary flow path, thereby preventing a large amount of the fluid of the main stream from escaping from the subject main flow path. When the main stream is biased to a side portion of the primary flow path by wind, the secondary flow path may fulfill a similar function. In the winter season, the fluid hardly freezes.

When the fluid is heating medium, the heating medium sticking to the fluid absorbing layer diffuses planarly uniformly so as to form a planar heat radiating surface having a desired quantity of heat within the fluid absorbing layer.

When the fluid flow controlling member of the present invention is used as a snow melting member, heating medium can be supplied to flow down along the primary flow path at a high flow rate. If the member is provided on a long roof, a sufficient amount of heat can be supplied to the roof.

Additionally, the fluid absorbing layer having a large area can be easily manufactured because of repetition structure of the primary and secondary flow paths in the lateral direction of the member.

BRIEF DESCRIPTION OF THE DRAWINGS

FIG. 1 is a perspective explanatory view showing an example of a member according to the invention used as a snow melting member;

FIG. 2 is a perspective explanatory view when snow is removed in the example of FIG. 1;

FIG. 3 is a perspective explanatory view showing another example of the member according to the invention used as the snow melting member;

FIG. 4 is a perspective explanatory view when snow is removed in the example of FIG. 3;

DETAILED DESCRIPTION OF THE PREFERRED EMBODIMENTS

A fluid flow controlling member according to one preferred embodiment of the present invention will now be described in detail with reference to the accompanying drawings. In the illustrated embodiment, the member is utilized as a snow melting member by way of example.

FIGS. 1 and 3 each illustrate a state in which the fluid flow controlling members are adhered to a surface 1 of a roof having ridges on which snow falls.

The member comprises a base layer 2a and a fluid absorbing layer 2 which is provided on the base layer. The base layer 2a may be made of a pressure sensitive adhesive layer, a composite material layer consisting of a synthetic resin member, a synthetic resin film and metallic foil or a metal vapor coating, a magnet plate member of plastics or rubber, a metal thin plate, a synthetic resin plate, or a metallic or plastic tray having side walls on opposite side edges thereof.

Figure 8:
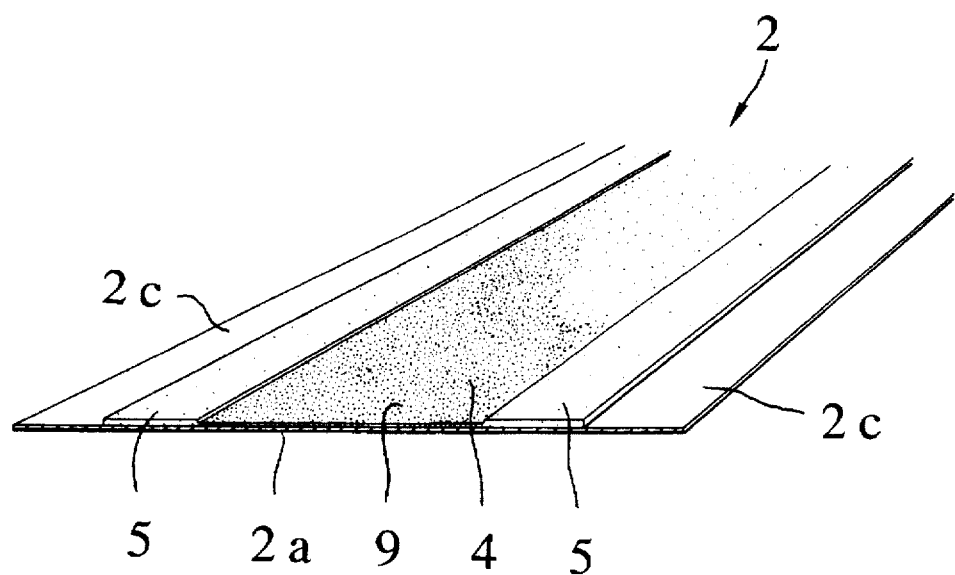
FIG. 8 is an explanatory view showing a fluid flow controlling member having an arrangement in which the width of a base layer is larger than that of a fluid absorbing layer.

As shown in FIG. 8, the base layer 2a is predetermined to have a width larger than that of the fluid absorbing layer 2 so that side edge portions 2c of the base layer 2a are located on the outsides of side edge portions of the fluid absorbing layer 2. With such structure of the side edge portions 2c of the base layer 2a, the water-proof base layer excellent in water repellency is provided between the roof surface deteriorated in water repellency and the outer edges of the fluid absorbing layer. The structure according to the invention by which the fluid does not directly contact with the roof surface, is preferable in view of prevention of corrosion of the roof steel plate. Further, the fluid flow restricting function of the member can be more improved owing to the water repellency of the exposed surface of the base layer.

In the illustrated embodiment, the fluid absorbing layers 2 are spacedly disposed, along which layers heating medium flows. This heating medium is a fluid having a feature as priming water for melting snow, for example, hot water such as underground water or water heated by a boiler. The heating medium flowing along the fluid absorbing layers is absorbed by snow particles, and snow sherbet is formed. Since the specific gravity of the snow sherbet is smaller than 1, when the snow sherbet floats on the heating medium, it tends to forcibly flow along the flow paths of the heating medium by flowing energy of the heating medium.

Intervals of arrangement of the fluid absorbing layers, the width and thickness of the fluid absorbing layer, and a temperature and flow rate of the heating medium are matters which can be appropriately selected.

The water converted from the snow melted by the heat of the heating medium is retained by the fluid absorbing layers 2 so that planar heat storage surfaces containing the heating medium and the water from the melted snow are formed. Although the temperature of the melted snow water is low, it has a certain amount of heat and the heat is also utilized effectively. Thus, the flow paths of the fluid absorbing layers act as planar heat radiating surfaces. The snow on the flow paths can be melted prior to the snow on the remaining portions of the roof.

FIGS. 2 and 4 each illustrate a state in which no snow lies on the flow paths, in other words, a state in which snow particles are melted by the heating medium just after they reach the flow paths so that no snow lies on the flow paths, or a state in which the melting of the snow proceeds mainly on the flow paths by continuously flowing down the heating medium after it has stopped snowing. In the drawings, reference numeral S designates the accumulation snow.

When an amount of the snowfall is very large and the quantity of heat possessed by the heating medium running along the flow paths of the fluid absorbing layers 2 is insufficient for instantaneously melting the snow, the snow accumulates. Because the flow paths act as the planar heat storage surfaces and heat radiating surfaces, the snow which has laid on the flow paths is melted prior to the snow on the remaining portions so that the lying snow is remarkably corrugated. A total area of the exposed surface of the lying snow is increased due to the appearance of the corrugation on the snow surface, thereby promoting the melting of the snow by the surrounding air risen in temperature, direct solar radiation, or the heat transmitted to the snow surface from the fluid absorbing layers.

The heating medium may be supplied continuously or intermittently. When supplying the heating medium, the pressure of supplying the heating medium can be varied so that the heating medium pulsates when it flows down along the flow paths. By thus intermittently supplying the heating medium, the snow sherbet may be conveyed more efficiently.

Figure 5:
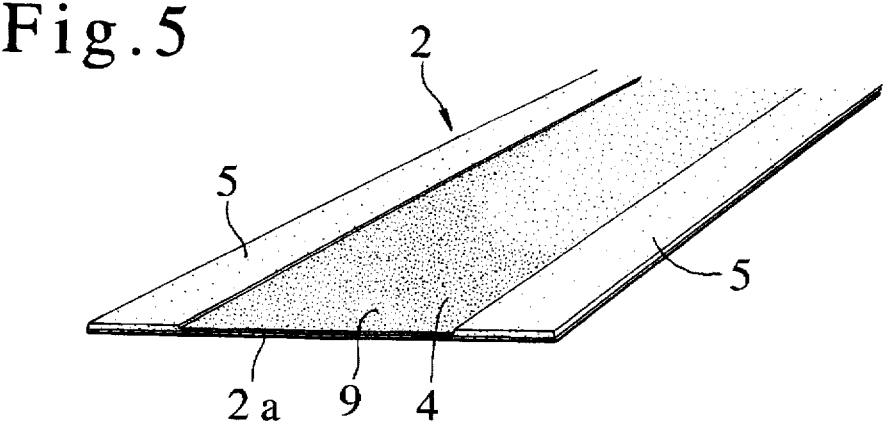
FIG. 5 is a perspective explanatory view showing one example of flow paths.

FIG. 5 is a perspective explanatory view showing a concrete example of the fluid absorbing layer shown in FIG. 1. The illustrated fluid absorbing layer 2 includes a primary flow path 4 having a relatively small capacity of containing fluid, and secondary flow paths 5 each having a relatively large capacity of containing fluid, which flow paths 5 are positioned on both sides of the main flow path 4. There are stepped portions between the primary and secondary flow paths 4 and 5, which define a groove 9, as shown in FIG. 5.

The thickness of the primary flow path 4 is small. The excessive heating medium which cannot be contained in the primary flow path 4 forms a main stream flowing along the surface of the primary flow path 4 in an exposed manner. The secondary flow paths 5 located on the both sides of the primary flow path 4 and having the relatively large fluid containing capacity are impregnated with a larger amount of the heating medium than the primary flow path. As a result, auxiliary streams of the heating medium run along the secondary flow paths at a relatively small flow rate and at a relatively slow speed. The main and auxiliary streams of the heating medium are located adjacently to each other and extended over the entire surface of the fluid absorbing layer.

Figure 6:
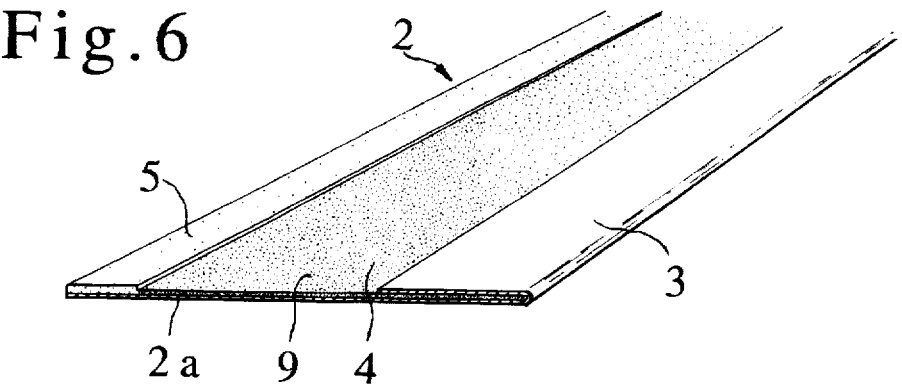
FIG. 6 is a perspective explanatory view showing another example of the flow paths.

FIG. 6 is a perspective explanatory view showing a concrete example of the fluid absorbing layer shown in FIG. 3. The illustrated fluid absorbing layer 2 includes a primary flow path 4 having a relatively small capacity of containing fluid, and a secondary flow path 5 having a relatively large capacity of containing fluid, which flow path 5 is positioned on a side of the primary flow path 4. A main stream of the heating medium is formed along the primary flow path 4. An auxiliary stream of the heating medium runs on one side of the main stream at a relative low flow rate and at a slow speed. The main and auxiliary streams of the heating medium are located adjacently to each other and extended over the entire surface of the fluid absorbing layer under a controlled condition.

An electric heater or a pipeline through which heating medium circulates can be previously embedded in or provided on the above-described flow paths.

At least a part of the flow paths of the fluid absorbing layer can be covered with a hydrophobic material 3 extending in the direction of movement of the heating medium for thermal insulation. When a hollow pipe passage is provided in the portion covered with the hydrophobic material, even if the fluid absorbing layer freezes, the fluid absorbing layer can be thawed by heating medium flowing through the pipe passage.

The fluid absorbing layer can be adhered to the surface of the roof before snow lies, by an adhesive applied to the surface of the base layer or an adhesive which forms the base layer. At least a part of the base layer is made of a magnet of plastics or rubber containing a large amount of iron powder, which is excellent in thermal conductivity, so that the base layer sticks to the contacting surface made of steel due to the magnetic force. The fluid absorbing layer may be fixedly secured to the roof surface with any other fixture means which are well known.

Figure 9:
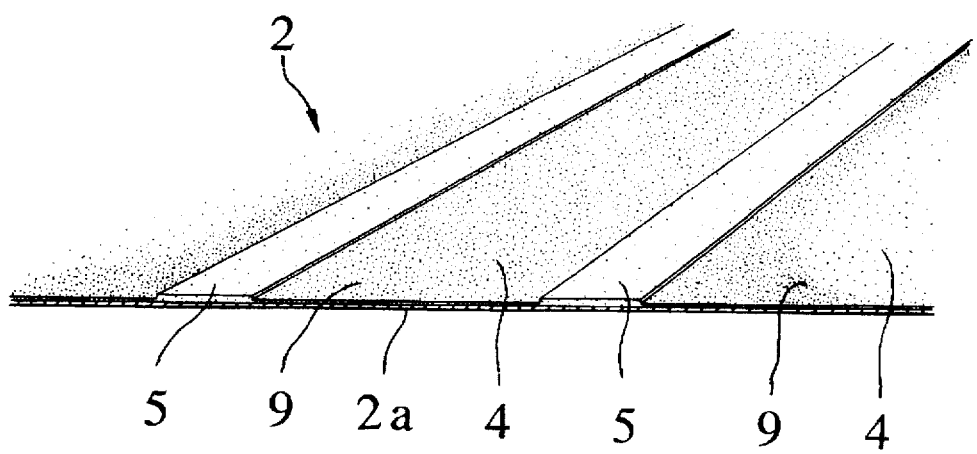
FIG. 9 is an explanatory view showing a fluid flow controlling member having an arrangement in which flow paths are arranged adjacently to each other.

The fluid absorbing layer 2 may be arranged in a strip-like shape, and a plurality of the fluid absorbing layers may be located spacedly, as shown in FIG. 1, or they may be arrayed in contact with one another at their side edge portions, as shown in FIG. 9. The fluid absorbing layer 2 of FIG. 9 includes a number of primary flow paths and secondary flow paths which are alternately arrayed in a lateral direction of the absorbing layer.

The heating medium may be supplied to the fluid absorbing layers by heating medium supply means provided on a top of the roof. The heating medium may be only supplied to the respective primary flow paths through nozzles. In such case, the primary flow path of the fluid absorbing layer is made of hydrophilic fiber, for example, water absorption fiber such as vinylon or composite fiber of vinylon and polyester, and the secondary flow path is made of woven fabric, nonwoven fabric or knitted fabric of hydrophobic fiber such as polyester. Further, the primary flow path may be formed by plain weaving and the secondary flow path may be formed by twilling or diagonal weaving which requires a large amount of threads. Possibly, any other method of weaving can be chosen.

The wordings "hydrophilic" and "hydrophobic" mean the relative characters between them. More particularly, the flow path having a small capacity of containing liquid, i.e., the primary flow path does not always mean a portion made of the hydrophobic fiber, but of course it may be formed of the hydrophilic fiber.

The "hydrophilic" and "hydrophobic" properties are important at the primary stage of the fluid flowing process of the fluid absorbing layer. If the primary flow path of the layer is made of the hydrophilic fiber, it promptly absorbs the flowing fluid and is saturated with the fluid so that the exposed heating medium flow expanded over the primary flow path appears quickly. Unfortunately, however, such hydrophilic fiber exhibits a defect such as ready organic resolution in the severe surrounding environment. On the contrary, the hydrophobic fiber such as polyester is excellent in weather resistance and anti-organic resolution. Meanwhile, the fluid absorbing function can be controlled to some extent by changing a tensile force applied to the threads.

The woven fabric comprises portions made of hydrophobic warps and wefts and stripe-like portions where hydrophilic warps are densely threaded or woven in addition to the hydrophobic warps. Thus, the portions as primary flow paths where the hydrophilic warps are densely threaded can be provided adjacently to the hydrophobic portions of the fabric.

The nonwoven fabric includes a portion acting as a primary flow path of hydrophilic fiber, and a portion acting as a secondary flow path of hydrophobic fiber, the portion as the secondary flow path being located on a side of the portion acting as the primary flow path. The wordings "hydrophilic" and "hydrophobic" mean the relative characters between them, as has been mentioned above.

The woven fabric may comprise portions made of hydrophilic warps and wefts and portions where hydrophobic warps are densely threaded or woven in addition to the hydrophilic warps which portions are located on sides of the hydrophilic portions. Thus, the fabric is provided with the hydrophilic portions and the portions where the hydrophobic warps are densely threaded, both of which portions are located adjacently to each other.

Alternatively, the woven fabric may comprise portions made of hydrophilic warps and wefts and stripe-like portions where warps having more excellent fluid reserving property than the hydrophilic warps are densely threaded in addition to the warps, which warps are superior in fluid absorbing ability to the remaining hydrophilic warps. The hydrophilic portion of the woven fabric acting as the secondary flow path and the portion acting as the primary flow path where the warps having the superior fluid reserving property are densely threaded can be provided adjacently to each other.

Further, the woven fabric may comprise portions made of hydrophilic warps and wefts and stripe-like portions where hydrophilic warps larger in diameter than the former hydrophilic warps are densely threaded in addition to the warps. The hydrophilic portion of the woven fabric acting as the secondary flow path and the portion acting as the primary flow path where the hydrophilic warps having the larger diameters are densely threaded can be provided adjacently to each other.

The woven fabric may comprise portions made of hydrophobic warps and wefts and stripe-like portions where hydrophobic warps larger in diameter than the former hydrophobic warps are densely threaded in addition to the warps. The hydrophobic portion of the woven fabric acting as the secondary flow path and the portion acting as the primary flow path where the hydrophobic warps having the larger diameters are densely threaded can be provided adjacently to each other.

In contrast with the above-described structures, the fluid absorbing layer includes a main flow path of powder coating excellent in fluid absorbing ability which is adhered to the base layer, and a secondary flow path of another powder coating inferior in fluid absorbing ability which is also adhered to the base layer, the another powder coating being located on a side of the primary flow path.

The fluid absorbing layer can be formed of a powder coating layer adhered on a roof surface. In this case, the roof surface acts as a base layer relative to the fluid absorbing layer of the powder coating layer.

In contrast with this, a base layer is formed with coarsely or finely concave and convex portions, or with fine grooves extending in parallel in the longitudinal direction of the base layer. The concave and convex portions or grooves can be regarded as the fluid absorbing layer. The depth of the groove or height of the convex portion can be selected to control the fluid containing capacity. This surface character may constitute primary and secondary flow paths. Preferably, the base layer is made of a plastic material. If the base layer is of a flat metal, a plurality of flat metal members can be stacked.

Alternatively, the fluid absorbing layer may be formed of both hydrophilic and hydrophobic fibers mixed or combined with each other. A rate of mixing of the hydrophilic fiber in the portion acting as the primary flow path is higher than that in the portion acting as the secondary flow path.

Figure 7:
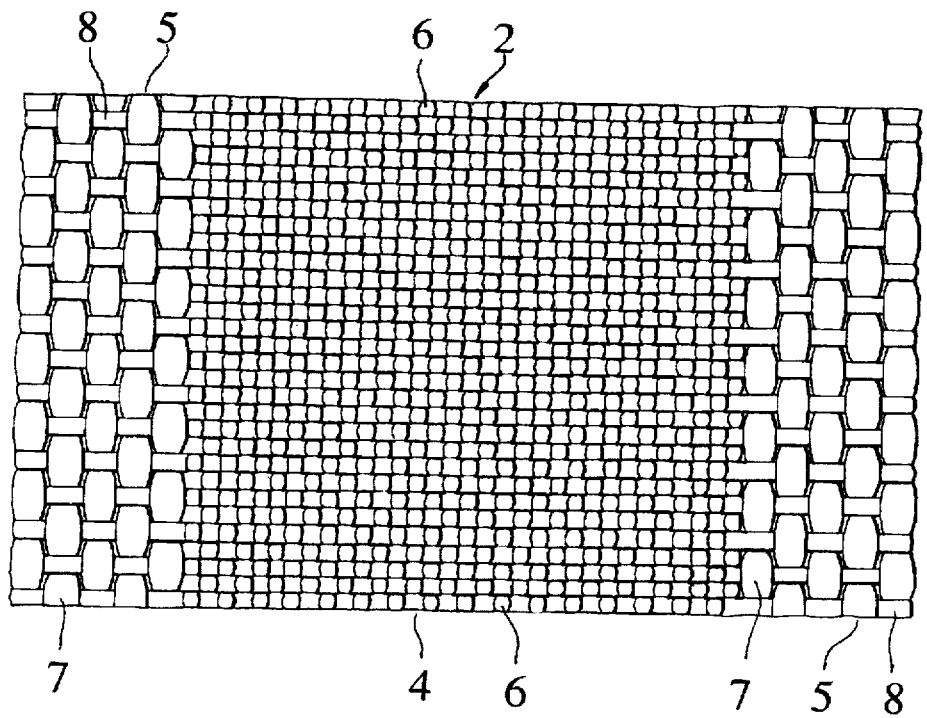
FIG. 7 is a schematic explanatory view showing one example of the snow melting member made of woven fabric.

FIG. 7 shows one example of the snow-melting member formed of woven fabric. In the drawing, reference numeral 6 designates warps used in a portion acting as a primary flow path 4. The warp comprises two threads each consisting of three composite yarns each of which is made of polyester (core yarn) and vinylon (spirally wound around the polyester core yarn). The three composite yarns are intertwined with one another. The composite yarn has a diameter substantially equal to that of a No. 10 count cotton yarn. The secondary flow paths 5 on both sides of the primary flow path are formed of twill portions in which warps 7 of intertwined thick polyester yarns are used. Wefts 8 used in the portions for the primary and secondary flow paths are each composed of four intertwined No. 18 count polyester yarns.

According to the structure of the woven fabric illustrated in FIG. 7, the vinylon yarn of the polyester/ vinylon composite warp yarn exhibits excellent liquid absorbing ability. This vinylon yarn is apt to shrink along the outer periphery of the polyester core yarn, but this shrinkage does not affect on the woven fabric itself so that the woven fabric is not be wrinkled. Because the two treads each consisting of the three composite yarns are used together as the warp, the heating medium tends to move along the warp.

When a plurality of wefts are lined in closed relationship to form a number of small ridges extending parallel in the lateral direction of the fabric, the flowing heating medium successively rides over these ridges and is extended laterally along the ridges. The principle of the lateral flow tendency can be applied to the above example.

Performed was an experiment in which the fluid flow controlling member having the above-described structure of the woven fabric was used as a sheet for melting snow. The snow melting sheet was adhered to the roof of steel plate. The length and width of the sheet was 3800 mm and 390 mm, respectively. In the sheet, four primary flow paths (the width of which was 75 mm) and three secondary flow paths (the width of which was 30 mm) were arranged adjacently to each other. Underground water of about 12° C. was supplied to each primary flow path at a flow rate of 180 cc per minute. The number of the sheets used in the experiment was four in total. The sheets were spacedly disposed at intervals of about 50 mm. As a result of the experiment, at the surrounding air temperature of approximately 0° C., the snow did not lie in excess of 3 cm under any condition of snowing. This proves that the entire surface of the sheet uniformly exhibited a performance as the planar heat radiating surfaces and that the flow of the heating medium was accurately controlled.

When the fluid absorbing layer is made of a fibrous material, the kind of the fibrous material is not particularly restricted to the above-described ones. The whole or a part of the material constituting the flow paths may be formed of fire-resistant fiber such as carbon fiber or incombustible fiber such as glass fiber in order to take precautions against fire. Surface properties of such fiber are previously selected appropriately so that fluid can be absorbed sufficiently by the fluid absorbing layer.

The number and dimensions of width and length of the primary and secondary flow paths are matters which can be appropriately selected. In FIG. 9, the primary and secondary flow paths are arranged adjacently to each other.

In case of wet snow, a bridge of the snow is easily formed extending across the flow path, as compared with dry snow having a low moisture content. In order to prevent such phenomenon, it is necessary to predetermine the width of the flow path and the number of the paths to be enough large.

The fluid flow controlling member according to the invention can be applied to various heat exchangers, in addition to the snow melting heat exchanger described above. In an industrial field of the invention, although the snow melting heat exchanger is merely an example of the peculiar case, cheap and readily-constructible technique for removing snow disasters is remarkably beneficial. Unfortunately, however, there is no concrete method satisfying the demands of the people living in the heavy snow area, so that the success in the snow melting treatment leads to a large change of an appearance of houses and streets, and is representative of high excellence as a heat exchanger.

As many apparently widely different embodiments of this invention may be made without departing from the spirit and scope thereof, it is to be understood that the invention is not limited to the specific embodiments thereof except as defined in the appended claims.

What is claimed is:

1. A fluid flow controlling member having a base layer and a fluid absorbing layer provided on said base layer, in which said fluid absorbing layer comprises:

a primary flow path means to which fluid is supplied, having a relatively small capacity of containing the fluid so that it absorbs part of the flowing fluid and the remaining fluid moves along the surface of the primary flow path means in an exposed manner, and a secondary flow path means located on a side of said primary flow path means and having a relatively large capacity of containing fluid, said secondary flow path means being supplied with the flowing fluid from the side of the primary flow path means which enters at the side edge of the secondary flow path means and flows through it, whereby the fluid-saturated secondary flow path means defines a boundary area for restrictedly holding the side region of the fluid flow of the primary flow path means and control the fluid flow in an equilibrium.

2. A fluid flow controlling member according to claim 1, wherein said base layer comprises a pressure sensitive adhesive layer.

3. A fluid flow controlling member according to claim 1, wherein said base layer is made of a material selected from the group consisting of a metal plate or sheet, a synthetic resin plate or sheet, a metallic foil coated synthetic resin film, a plastic or rubber magnetic sheet, and a plastic and metal laminated sheet.

4. A fluid flow controlling member according to claim 3, wherein the base layer is predetermined to have a width larger than that of the fluid absorbing layer so that side edge portions of the base layer are located on the outsides of side edge portions of the fluid absorbing layer.

5. A fluid flow controlling member according to claim 1, wherein the fluid absorbing layer is made of a material selected from the group consisting of woven fabric, non-woven fabric, knitted fabric and other fibrous materials.

6. A fluid flow controlling member according to claim 1, wherein said member is used as a heat exchanger.

7. A fluid flow controlling member according to claim 1, wherein said member is used as an evaporator.

8. A fluid flow controlling member according to claim 1, wherein said member is used as fluid delivering passage means for transferring the fluid.

9. A fluid flow controlling member according to claim 1, wherein said fluid absorbing layers are provided on opposite surfaces of the base layer.

10. A fluid flow controlling member according to claim 1, wherein said fluid absorbing layer is formed with coarsely or finely concave and convex portions.

11. A fluid flow controlling member according to claim 1, wherein said base layer is a roof surface.

12. A fluid flow controlling member according to claim 1, wherein said base layer is a tray having side walls on opposite side edges thereof.

13. A fluid flow controlling member according to claim 1, wherein said member is used as cooling means for cooling a roof surface.

14. A fluid flow controlling member according to claim 1, wherein said member is used as snow melting means.

15. A fluid flow controlling member according to claim 1, wherein at least a part of the flow paths of the fluid absorbing layer is covered with a hydrophobic material extending in the direction of movement of the fluid.

16. A fluid flow controlling member according to claim 1, wherein a pipeline through which heating medium circulates is provided along said secondary flow path.

17. A fluid flow controlling member according to claim 1, wherein the member includes an electric heater.

18. A fluid flow controlling member according to claim 1, wherein the fluid absorbing layer is a powder coating.

19. A fluid flow controlling member having a fluid absorbing layer comprising:

a primary flow path means of a certain width, to which fluid is supplied, having a relatively small capacity of containing the fluid so that it absorbs part of the flowing fluid and the remaining fluid moves along the surface of the primary flow path means in an exposed manner, and a secondary flow path means having a width substantially smaller than the width of said primary flow path means, said secondary flow path means being located on a side of said primary flow path means and having a relatively large capacity of containing fluid, said secondary flow path means being supplied with the flowing fluid from the side of the primary flow path means which enters at the side edge of the secondary flow path means and flows through it, whereby the fluid-saturated secondary flow path means defines a boundary area for restrictedly holding the side region of the fluid flow of the primary flow path means and control the fluid flow in an equilibrium, said fluid absorbing layer forming a number of the fluid flows neighboring to each other.

20. A fluid flow controlling member having a fluid absorbing layer provided on an upper surface of the member, said fluid absorbing layer being formed with a number of fine straight parallel grooves extending in the longitudinal direction of the member, said fluid absorbing layer including a primary flow path, which primary flow path has a relatively small capacity of containing fluid so that it absorbs part of the flowing fluid and the remaining fluid flows along the surface of the primary flow path in an exposed manner, and a secondary flow path located on a side of said primary flow path and having a relatively large capacity of containing fluid, to thereby create a difference between the velocities of the fluid flows moving through the primary and secondary flow paths, the difference of the velocities defining the boundary area for restrictedly controlling the exposed flowing fluid on the primary flow path.

* * * * *